United States Patent

[11] 3,545,575

| [72] | Inventor | Friedrich Wilhelm Pinnhammer<br>Neuwied, Germany |
|---|---|---|
| [21] | Appl. No | 785,104 |
| [22] | Filed | Dec. 19, 1968 |
| [45] | Patented | Dec. 8, 1970 |
| [73] | Assignee | Girling Limited<br>Birmingham, England |
| [32] | Priority | Dec. 30, 1967 |
| [33] | | Great Britain |
| [31] | | No. 59,260/67 |

[54] DISC BRAKES AND SHOE RETAINING MEANS
3 Claims, 4 Drawing Figs.

[52] U.S. Cl..................................... 188/73.6,
F16d/65/02
[50] Field of Search........................... 188/73,
73(CL), 205.3

[56] References Cited
UNITED STATES PATENTS
3,243,017  3/1966  Kleinstuck.................... 188/73

3,255,848  6/1966  Harrison...................... 188/73
3,421,603  1/1969  Schuchmann et al........188/73(CL)UX
FOREIGN PATENTS
1,031,946  6/1966  Great Britain................ 188/73

*Primary Examiner*—George E. A. Halvosa
*Attorney*—Scrivener, Parker, Scrivener and Clarke ABSTRACT: A disk brake comprises a body member containing a pair of opposed hydraulic pistons, one of which acts on a directly operated pad and the other of which acts on a yoke slidably received on the body member and engaging an indirectly operated pad. Pad retaining pins pass through apertures in the pad backplates and are received in alined apertures in the body member and a bracket attached to the yoke. To normally prevent withdrawal of the pins and to bias the pins against the sidewalls of the apertures in the bracket, the ends of a spring releasably engage in holes in the pins. The spring embraces the bracket and has a portion received in a further aperture in the bracket to hold the spring captive on the bracket.

PATENTED DEC 8 1970

DISC BRAKES AND SHOE RETAINING MEANS

The present invention relates to a spot-type disk brake and in its more particular aspects to a disk brake provided with an actuator operative between a directly operated pad and a yoke slidably received in longitudinal grooves which extend along opposite sides of a supporting body member and adapted to operatively engage an indirectly operated pad, the pads being radially located whilst being permitted to move towards and away from one another, by pins which pass through apertures in back plates of the pads and through apertures in a bracket on the yoke and in the body member.

According to one aspect of the invention, at least one captive spring releasably engages by a respective end in a hole in each of the pins to prevent withdrawal of the pins.

According to another aspect of the invention, at least one spring cooperating with the bracket on the yoke releasably engages by a respective end in a hole in each of the pins and biasses the pins against the sides of the respective pin-receiving apertures in the bracket to prevent pin rattle in these apertures.

The invention is further described, by way of example, with reference to the accompanying drawings in which.

Figure 1:
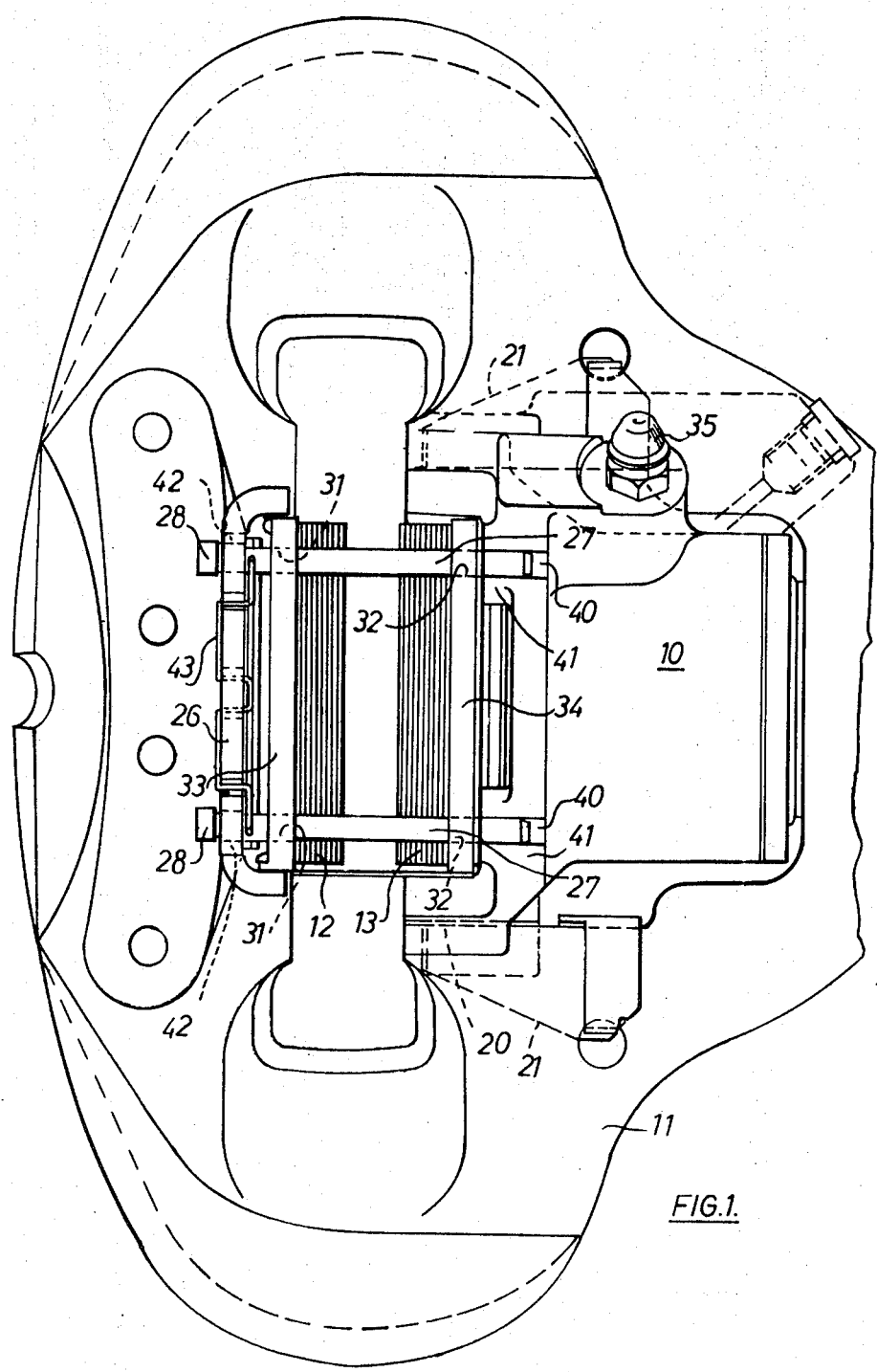
FIG. 1 is a plan view of a spot-type disk brake constructed in accordance with the invention.

Referring to FIG. 1 of the drawings, a spot-type disk brake comprises a body member 10, a yoke 11 adapted to operatively engage an indirectly operated pad 12 and a hydraulic actuator formed within the body member 10 and operative between the yoke 11 and a directly operated pad 13. The hydraulic actuator comprises a pair of opposed pistons (not shown) slidable within a cylinder constituted by a through bore in the body member 10.

The body member 10 has integral mounting lugs (not shown) adapted to be bolted to a torque plate or other fixed part of the wheel mounting (not shown) adjacent a disk (also not shown) so that the disk periphery extends between the pads 12, 13. The body member 10 has a pair of longitudinal grooves 20 formed at opposite sides thereof, in which grooves the inside edges of the yoke 11 are guided with clearance. A spring 21 acts between one wall of each groove 20 and the yoke to urge the yoke against the other walls of the grooves 20 to avoid spragging. One of the actuator pistons acts on the pad 13 whilst the other acts on the yoke 11 which is also located in said other piston by an inwardly extending tongue (not shown) formed integrally with the yoke and supported in a blind bore in said other piston.

An upstanding bracket 26, secured to the yoke 11, e.g., by rivets, adjacent the pad 12, has apertures 42 in which are supported one end of a pair of pad-retaining pins 27 whose other ends are slidably received in bores 40 through lugs 41 on the body member 10. The pins 27 have heads 28 to prevent the pins passing right through the bracket 26 during fitting of the brake pads. Backing plates 33 and 34 respectively on the pads 12 and 13 have apertures 31 and 32 through which pass the pins 27 whereby the pads 12 and 13 are radially located in their appropriate positions. An inlet or bleeder opening 35, communicating with the hydraulic cylinder is provided at the top of the body member 10.

Figure 2:
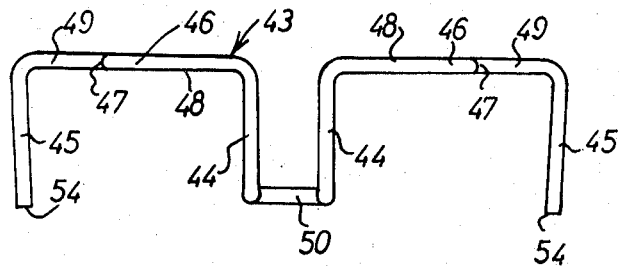
FIG. 2 is an enlarged elevation of a retaining spring for the pad supporting pins of the brake of FIG. 1.
Figure 3:
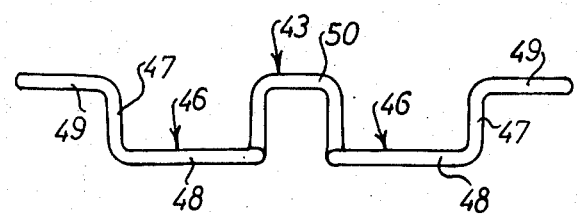
FIG. 3 is a plan view of the spring of FIG. 2.
Figure 4:
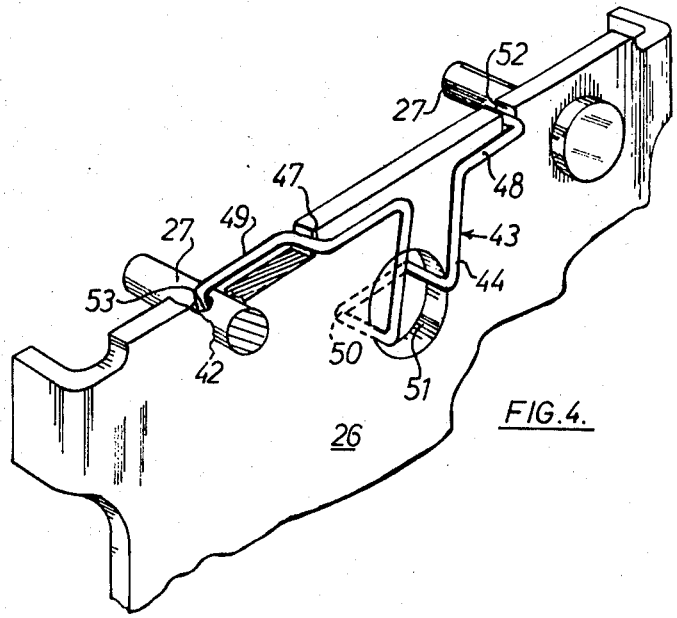
FIG. 4 is a fragmentary perspective view of the spring in its fitted state.

A captive spring 43 prevents withdrawal of the pins 27 and is shown in detail in FIGS. 2 and 3. The spring 43 is generally M-shaped in elevation FIG. 2) and generally W-shaped in plan (FIG. 3). As seen in elevation, the spring 43 has a pair of centre legs 44 and a pair of side legs 45 joined to the centre legs by top portions 46. The side legs 45 are inwardly inclined at an angle up to 3°. As seen in plan, each of the top portions 46 has a kink 47 between inner and outer parts 48 and 49 respectively, and the centre legs are joined by a U-shaped portion 50. As shown in FIG. 4, the bracket 26 has an aperture 51 which receives the centre U-shaped portion 50 of the spring 43 and upper notches 52 which receive the kinks 47. Thus the centre legs 44 and the inner parts 48 of the top portion lie at one side of the bracket 26 whilst the outer parts 49 and the side legs lie at the other side of the bracket. The spring is thereby held captive on the bracket and can easily be snapped into position. To retain the pins 27 in place, the side legs 45 are inserted in corresponding holes 53 in the pins 27. The spacing between the free ends 54 (FIG. 2) of the side legs 45 is slightly less than the distance between the axes of the pins 27 and the kinks 47 are received with clearance in the notches 47 so that the spring 43 biases the pins 27 towards one another and against the inward sides of the apertures 42 to prevent the pins from rattling on the bracket.

To effect a pad change, the ends 54 of the spring can be lifted out of the holes 53 to permit withdrawal of the pins 27, without removing the spring 43 from the bracket 26. The risk of the spring being lost is therefore minimised.

I claim:

1. A spot-type disk brake comprising a supporting body member having longitudinal grooves extending along opposite sides thereof, a yoke slidably received in said grooves, opposed directly and indirectly operated pad assemblies, actuator means in said body member and operative between said directly operated pad and said yoke, said yoke being operative on said indirectly operated pad assembly, a bracket on said yoke adjacent said indirectly operated pad assembly, said pad assemblies having apertures therein, said bracket and said body member both having apertures alined with said apertures in said pad assemblies, pad-retaining pins passing through said apertures in said pad assemblies and received in said apertures in said bracket and said body member to radially locate said pad assemblies, each of said pad-retaining pins having a hole therein at one side of said bracket and said bracket having a further aperture therein, and a wire spring having a centre U-shaped portion, centre legs extending from said U-shaped portion, side legs having free ends and top portions respectively joining said side legs to said centre legs, said spring being disposed on said bracket with said centre U-shaped portion engaged in said further aperture in said bracket, said centre legs lying on the side of said bracket remote from said one side, said top portions embracing both said sides of said bracket and said free ends releasably engaged in said holes in said pins, said spring being captive on said bracket and exerting lateral biasing forces on said pins.

2. A disk brake according to claim 1 in which said bracket has a free edge with notches therein and each of said top portions of said spring has a kink therein disposed in a respective one of said notches.

3. A disk brake according to claim 1 in which said actuator means comprises a through bore in said body member and a pair of opposed hydraulic pistons slidable in said through bore.